United States Patent
Obie et al.

(10) Patent No.: US 11,133,693 B2
(45) Date of Patent: Sep. 28, 2021

(54) APPARATUS, SYSTEMS, AND METHODS FOR DISTRIBUTED CHARGING AND DISCHARGING

(71) Applicant: Facebook Technologies, LLC, Menlo Park, CA (US)

(72) Inventors: Gene R. Obie, Coupeville, WA (US); Xiaobei Li, Sammamish, WA (US); Sam Sarmast, Redmond, WA (US); Karthik Kadirvel, San Jose, CA (US); Jason Howard, Alpharetta, GA (US)

(73) Assignee: Facebook Technologies, LLC, Menlo Park, CA (US)

( * ) Notice: Subject to any disclaimer, the term of this patent is extended or adjusted under 35 U.S.C. 154(b) by 31 days.

(21) Appl. No.: 16/800,495

(22) Filed: Feb. 25, 2020

(65) Prior Publication Data
US 2020/0395778 A1 Dec. 17, 2020

Related U.S. Application Data

(60) Provisional application No. 62/861,915, filed on Jun. 14, 2019.

(51) Int. Cl.
*H02J 7/00* (2006.01)
*G02B 27/01* (2006.01)
(Continued)

(52) U.S. Cl.
CPC ........ *H02J 7/0068* (2013.01); *G02B 27/0176* (2013.01); *H02J 7/00047* (2020.01);
(Continued)

(58) Field of Classification Search
CPC ...... H02J 7/0013; H02J 7/345; H02J 2207/30; H02J 1/108; H02J 7/0068; G02B 27/0176;
(Continued)

(56) References Cited

U.S. PATENT DOCUMENTS 6,362,597 B2 * 3/2002 Leppo ................. G06F 1/263
320/116
10,523,042 B2 * 12/2019 Song ..................... H02J 7/00
(Continued)

OTHER PUBLICATIONS

Zhang et al., "Apparatus, System, and Method for Supplying High-Current Pulses", U.S. Appl. No. 15/726,135, filed Oct. 5, 2017, 37 pages.

*Primary Examiner* — Jared Fureman
*Assistant Examiner* — Duc M Pham
(74) *Attorney, Agent, or Firm* — FisherBroyles, LLP

(57) ABSTRACT

An apparatus may include a power rail, a subassembly, an additional subassembly, and an interface coupling the subassembly to the additional subassembly. The subassembly may include a load, an energy-storing component, a charger having an output coupled to the energy-storing component, and a reverse-current limiter having a first terminal coupled to the energy-storing component. The additional subassembly may include an additional energy-storing component, an additional charger having an output coupled to the additional energy-storing component, and an additional reverse-current limiter having a first terminal coupled to the additional energy-storing component. The power rail may cross the interface and may couple the load, an input of the charger, a second terminal of the reverse-current limiter, an input of the additional charger, and a second terminal of the additional reverse-current limiter. Various other apparatuses, systems, and methods are also disclosed.

20 Claims, 16 Drawing Sheets

(51) Int. Cl.
*H02J 7/34* (2006.01)
*G04G 17/06* (2006.01)

(52) U.S. Cl.
CPC ...... *H02J 7/345* (2013.01); *G02B 2027/0178* (2013.01); *G04G 17/06* (2013.01)

(58) Field of Classification Search
CPC . G02B 2027/0178; G04G 17/06; G04G 21/04
See application file for complete search history.

(56) References Cited

U.S. PATENT DOCUMENTS

| | | | |
|---|---|---|---|
| 2006/0145538 A1* | 7/2006 | Proefrock | H02J 7/0019 307/18 |
| 2013/0232348 A1 | 9/2013 | Oler et al. | |
| 2015/0303695 A1* | 10/2015 | Perry | H01M 10/425 307/80 |

* cited by examiner

APPARATUS, SYSTEMS, AND METHODS FOR DISTRIBUTED CHARGING AND DISCHARGING

CROSS REFERENCE TO RELATED APPLICATION

This application claims the benefit of U.S. Provisional Application No. 62/861,915, filed 20 Jun. 2019, the disclosures of each of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
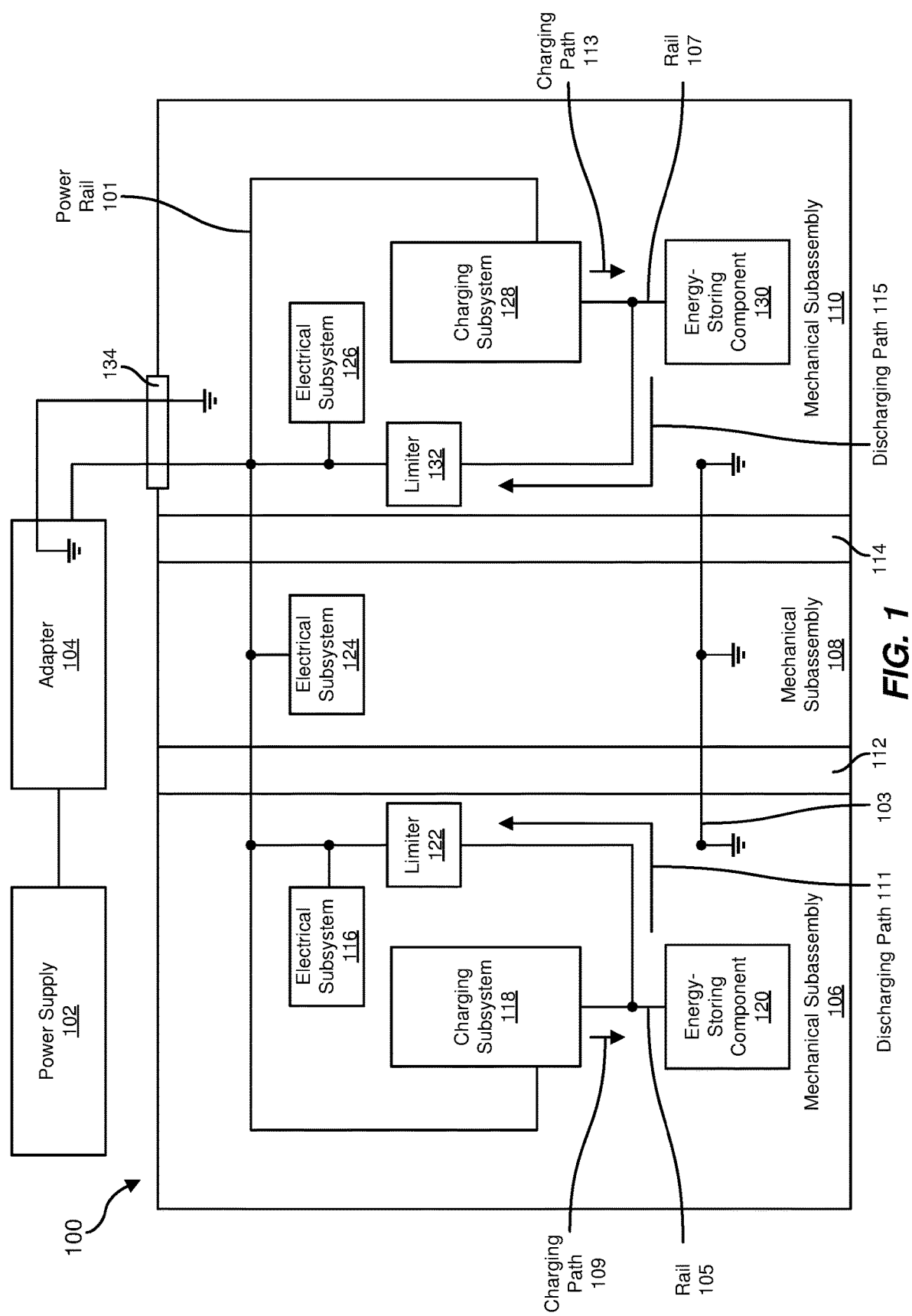
FIG. 1 is a block diagram of an exemplary power supply, an exemplary adapter, and an exemplary apparatus having multiple chargers and multiple energy-storing components distributed across multiple mechanical subassemblies, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Conventional charger topologies for battery-powered electronic devices with integrated chargers generally include at least two high-power rails (or buses): a power input rail (commonly referred to as VBUS) that supplies an input voltage to the integrated chargers, a charging output rail (commonly referred to as VSYS) that supplies a charging current to a connected battery (VBATT). The system supply output rail (commonly referred to as VSYS) supplies a system current to other electronic components of the electronic devices. Some conventional charger topologies may use the same integrated chargers to provide both charging current and system current.

Some electronic devices are made up of multiple subassemblies (e.g., electronic devices having foldable or mechanical-split designs are typically made up of many subassemblies). Often, subassemblies are small and/or unable to contain large monolithic batteries. Unfortunately, if used in electronic devices having multiple subassemblies with multiple distributed batteries, the conventional charger topologies described above may require two or more high-power buses (e.g., VBUS, VSYS, and/or VBATT) to cross the mechanical interfaces that connect the multiple subassemblies. Unfortunately, due to various mechanical and/or electrical constraints this may not always be feasible, especially when mechanical interfaces have significant space and wiring limitations. In addition, power paths that cross mechanical interfaces often experience undesirable voltage drops and power losses.

The present disclosure is generally directed to power-path designs that use a single high-current power rail for electronic devices having multiple batteries (or other energy-storing components) and/or multiple chargers distributed across multiple mechanical subassemblies. As will be explained in greater detail below, embodiments of the present disclosure may (1) enable optimized power-path designs for small form factor devices made up of multiple subassemblies mechanically separated by multiple hinges or electrically constrained boundaries, (2) reduce power losses (e.g., heat loss) in systems that have tight thermal constraints, and/or (3) enable chargers and batteries to be located to fit size and physical design constraints and/or to optimize power-distribution networks.

Features from any of the embodiments described herein may be used in combination with one another in accordance with the general principles described herein. These and other embodiments, features, and advantages will be more fully understood upon reading the following detailed description in conjunction with the accompanying drawings. The embodiments described herein may be applicable to apparatuses having folding and/or split designs where various electronic subsystems, including batteries, are housed in connected but separate mechanical subassemblies. Examples include split-screen laptops, foldable phones, smart wearables, AR/VR glasses, etc.

The following will provide, with reference to FIGS. 1-8, detailed descriptions of example apparatuses having multiple chargers and multiple energy-storing components distributed across mechanical subassemblies and examples of corresponding adaptors. Detailed descriptions of an example method for electrically coupling various components and subsystems to a single power rail will also be provided in connection with FIG. 9. Finally, with reference to FIGS. 10-16, the following will provide detailed descriptions of various artificial-reality systems and components that may implement embodiments of the present disclosure.

FIG. 1 is a block diagram of an example apparatus 100 having multiple mechanical subassemblies, multiple distributed electrical subsystems, multiple distributed charging subsystems, multiple distributed energy-storing components, and a single interface-spanning power rail 101 (e.g., a single high-power or high-current electrical conductor). Although one particular arrangement for example apparatus 100 may be described below, those of ordinary skill in the art will recognize that aspects of the present technology are not limited to the particular arrangements illustrated herein but can be implemented in various other modular arrangements of the same or similar components. For example, other exemplary apparatuses may include two mechanical subassemblies or more than three mechanical subassemblies. Additionally, some exemplary apparatuses may include electrical subsystems, charging subsystems, energy-storing components, and/or a power rail spanning some or all of their mechanical subassemblies.

As shown in FIG. 1, example apparatus 100 may include a mechanical subassembly 106, a mechanical subassembly 108, and a mechanical subassembly 110. Mechanical subassembly 106 may be physically coupled to mechanical subassembly 108 by a mechanical interface 112, and mechanical subassembly 108 may be physically coupled to mechanical subassembly 110 by a mechanical interface 114. In some examples, mechanical subassemblies 106-110 may represent individual units or parts of a larger assembly or device. In some examples, mechanical subassemblies 106-110 may be essential mechanical subassemblies of a larger assembly that have been manufactured or assembled separate from each other and then later assembled together to form the larger assembly. In other examples, one or more of mechanical subassemblies 106-110 may be independent, non-essential, exchangeable, or auxiliary mechanical subassemblies of a modular system that have been assembled to form the modular system. Mechanical interfaces 112 and 114 may represent any type or form of interface that is capable of physically and electrically coupling two or more mechanical subassemblies. In some examples, one or more of mechanical interfaces 112 and 114 may represent a hinging or folding mechanical interface.

As shown in FIG. 1, power rail 101 may span mechanical interfaces 112 and 114, and a common ground 103 may electrically ground mechanical subassemblies 106, 108, and 110 across mechanical interfaces 112 and 114. Power rail 101 may be available to all electrical subsystems in each of mechanical subassemblies 106, 108, and 110. In some embodiments, power rail 101 may be the only high-power or high-current rail to cross or be integrated into mechanical interfaces 112 and/or 114. Power rail 101 may be detachably coupled, via a charging port 134, to a charge cable adapter 104 that may regulate, relay, and/or manage power delivery from an external power supply 102.

Example apparatus 100 may include one or more electrical loads (e.g., any electrical component or portion of a circuit) distributed across mechanical subassemblies 106, 108, and 110, and each of the electrical loads may draw or consume power from power rail 101. For example, mechanical subassembly 106 may include an electrical subsystem 116 electrically coupled to power rail 101, mechanical subassembly 108 may include an electrical subsystem 124 electrically coupled to power rail 101, and mechanical subassembly 110 may include an electrical subsystem 126 electrically coupled to power rail 101.

Example apparatus 100 may include one or more charging subsystems distributed across mechanical subassemblies 106, 108, and 110 in an individual charger configuration, and each of the charging subsystems may draw or consume power from power rail 101 and output a charging voltage or current to a connected output rail (e.g., a battery rail). For example, mechanical subassembly 106 may include a charging subsystem 118 having an input electrically coupled to power rail 101 and an output electrically coupled to rail 105, and mechanical subassembly 110 may include a charging subsystem 128 having an input electrically coupled to power rail 101 and an output electrically coupled to rail 107. In some examples, charging subsystems 118 and/or 128 may represent or include a linear charger, a switching-based charger (e.g., a buck charger), or a pulse charger. In the individual charger configuration illustrated in FIG. 1, charging subsystems 118 and/or 128 may perform charging functions independently and without any need for additional power and control-signal connections between mechanical subassemblies 106, 108, and/or 110.

Example apparatus 100 may include one or more energy-storing components (e.g., electrochemical batteries or supercapacitors) distributed across mechanical subassemblies 106, 108, and 110, each supplying power to or consuming power from a connected rail. For example, mechanical subassembly 106 may include an energy-storing component 120 electrically coupled to rail 105, and mechanical subassembly 110 may include an energy-storing component 130 electrically coupled to rail 107. Energy-storing component 120 and energy-storing component 130 may be connected in a parallel discharge configuration to power rail 101 via reverse-current limiters 122 and 132, as shown. In some examples, energy-storing component 120 and energy-storing component 130 may represent or include batteries having the same nominal voltage but different cell configurations, different chemistries, and/or different capacities. For example, energy-storing component 120 and energy-storing component 130 may represent batteries configured with the same voltage (e.g., 1s, 2s, or 3s) but different capacities. While not illustrated, other embodiments may include three batteries in separate mechanical housings each with different parallel cell configurations (e.g., 1s1p, 1s2p, 1s3p). The batteries described herein may be composed of individual cells arranged in series and/or parallel. The number of a battery's cells that are in series may be shown as 1s, 2s, 3s, etc., and the number of its cells that are in parallel may be shown as 1p, 2p, 3p, etc.

Example apparatus 100 may include one or more reverse-current limiters that limit the direction current is allowed to flow from power rail 101 to rails directly coupled to energy-storing components. For example, mechanical subassembly 106 may include reverse-current limiter 122 having one terminal electrically coupled to power rail 101 and a second terminal electrically coupled to rail 105, and mechanical subassembly 110 may include reverse-current limiter 132 having one terminal electrically coupled to power rail 101 and a second terminal electrically coupled to rail 107. Reverse-current limiters 122 and/or 132 may include any one or combination of elements that control, limit, and/or otherwise regulate the direction current is allowed to flow through reverse-current limiters 122 and/or 132. In some examples, reverse-current limiters 122 and/or 132 may include or represent a diode, an ideal diode, an ideal diode controller, or an ideal diode load switch that provides reverse current protection.

Reverse-current limiters 122 and/or 132 may prevent current from flowing from power rail 101 to rails 105 and 107 but may allow current to flow from rails 105 and 107 to power rail 101 when the voltages of the rails are greater than the voltage of power rail 101 (e.g., when cable charge adapter 104 is disconnected from charging port 134 or when the electrical subsystems of exemplary apparatus 100 draw more current than can be provided by cable charge adapter 104). Reverse-current limiters 122 and/or 132 may prevent any connected energy-storing components from drawing power directly from power rail 101 but may enable the energy-storing components to supply power or supplement power to power rail 101 when needed. In some embodiments, reverse-current limiters 122 and/or 132 may additionally perform various power-sharing and/or load-sharing functions by adjusting or limiting the forward currents flowing from rails 105 and 107 to power rail 101 (e.g., when the voltages of rails 105 and 107 are not equal and/or when energy-storing components 120 and 130 have different output current capabilities). In some embodiments, reverse-current limiters 122 and/or 132 may limit or control the amount of power a connected energy-storing device is allowed to supplement to power rail 101. In some embodiments, a reverse-current limiter may be designed to allow current to flow to power rail 101 when a voltage difference across its terminals is greater than a particular threshold and/or when a voltage of power rail 101 is below a particular low voltage. In some embodiments, example apparatus 100 may include reverse-current limiters with the same threshold values and/or the same low voltage levels. Additionally or alternatively, example apparatus 100 may include reverse-current limiters with different threshold values and/or different low voltage levels. In this way, the energy-storing components of example apparatus 100 may supply power or supplement power to power rail 101 in a desired order or sequence.

As shown in FIG. 1, rail 105 may include a charging path 109 that extends from charging subsystem 118 to energy-storing component 120 and a discharging path 111 that extents from energy storage component 120 to reverse-current limiter 122. Similarly, rail 107 may include a charging path 113 that extends from charging subsystem 128 to energy-storing component 130 and a discharging path 115 that extends from energy storage component 130 to reverse-current limiter 132. In some embodiments, the rails, subsystems, and/or components of example apparatus 100 may be arranged and/or located to optimize discharge paths 111 and 115. For example, the rails, subsystems, and/or components of example apparatus 100 may be arranged and/or located to minimize voltage drops along discharge paths 111 and/or 115. In some embodiments, energy-storing component 120 and/or 130 may be located to minimize the lengths of discharge paths 111 and/or 115, minimize discharge path losses, and/or maximize power-distribution-network efficiency. In some embodiments, charging subsystems 118 and/or 128 may be more remotely located if necessary. In at least one embodiment, discharge paths 111 and/or 115 may be optimally sized for high discharge rates, while the size of charging paths 109 and/or 113 may be minimized and/or sized for relatively lower charging rates (e.g., a charging rate four times less than the discharge rate).

Cable charge adapter 104 may represent an interface between power supply 102 (e.g., an upstream external Universal Serial Bus (USB) charging power provider) and example apparatus 100. In some examples, cable charge adapter 104 may supply a regulated or protected voltage and/or current to power rail 101 that charging subsystems 118 and 128 may use to charge energy-storing components 120 and 130 and/or that electronic subsystems 116 and 126 may use to function. In some examples, cable charge adapter 104 may perform various control and/or protection operations while supplying a voltage or current to power rail 101. For example, cable charge adapter 104 may provide Output Overvoltage Protection (OVP), Output Undervoltage Protection (UVP), and/or Overcurrent or Current Limit Protection. In at least one example, cable charge adapter 104 may perform various power delivery (PD) functions (e.g., USB BC1.2 discovery functions). In some embodiments, cable charge adapter 104 may be physically attached or detached via charging port 134 at any time.

Figure 2:
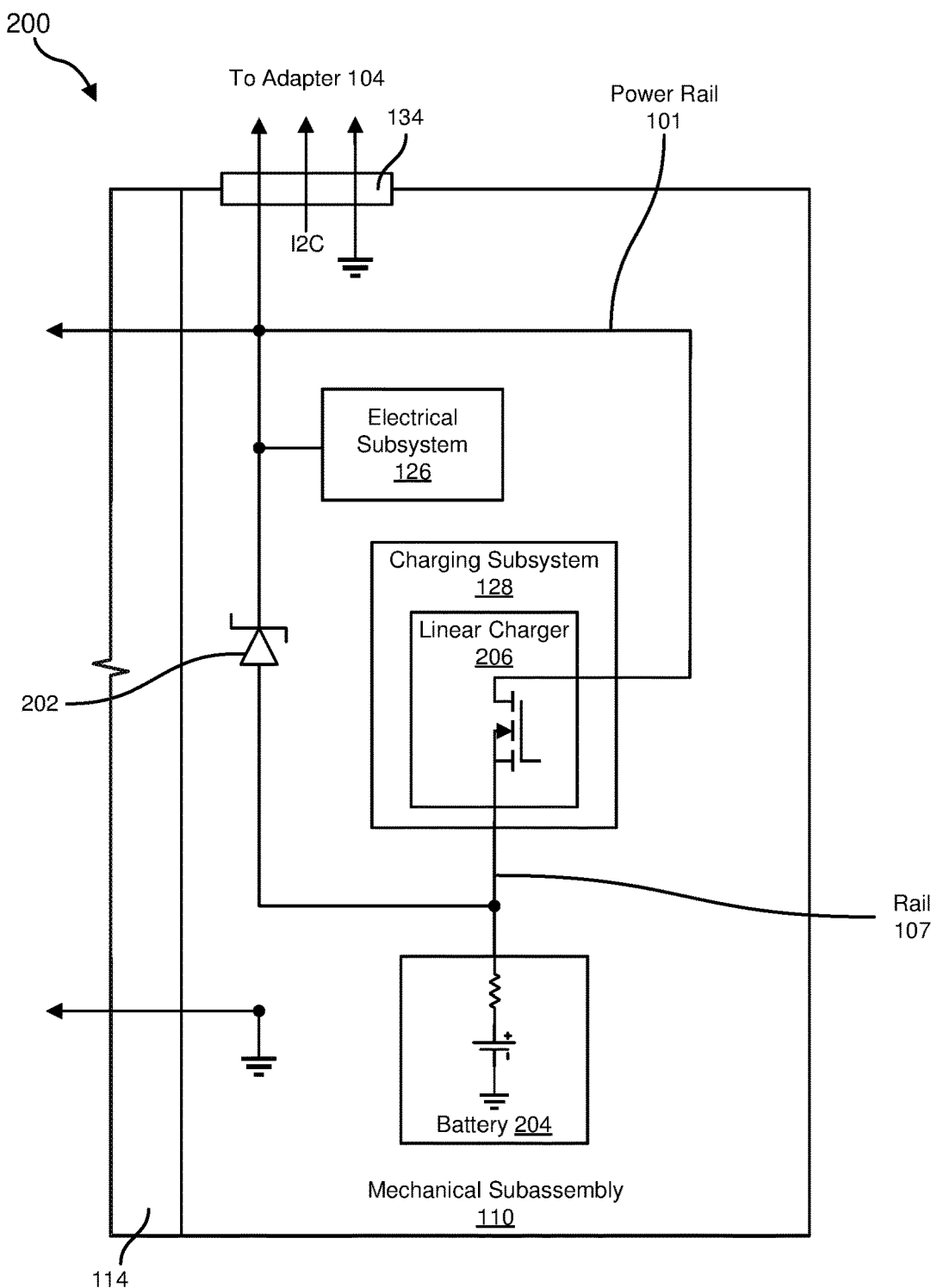
FIG. 2 is a block diagram of an exemplary configuration of some of the components of the exemplary apparatus illustrated in FIG. 1, according to some embodiments.
Figure 3:
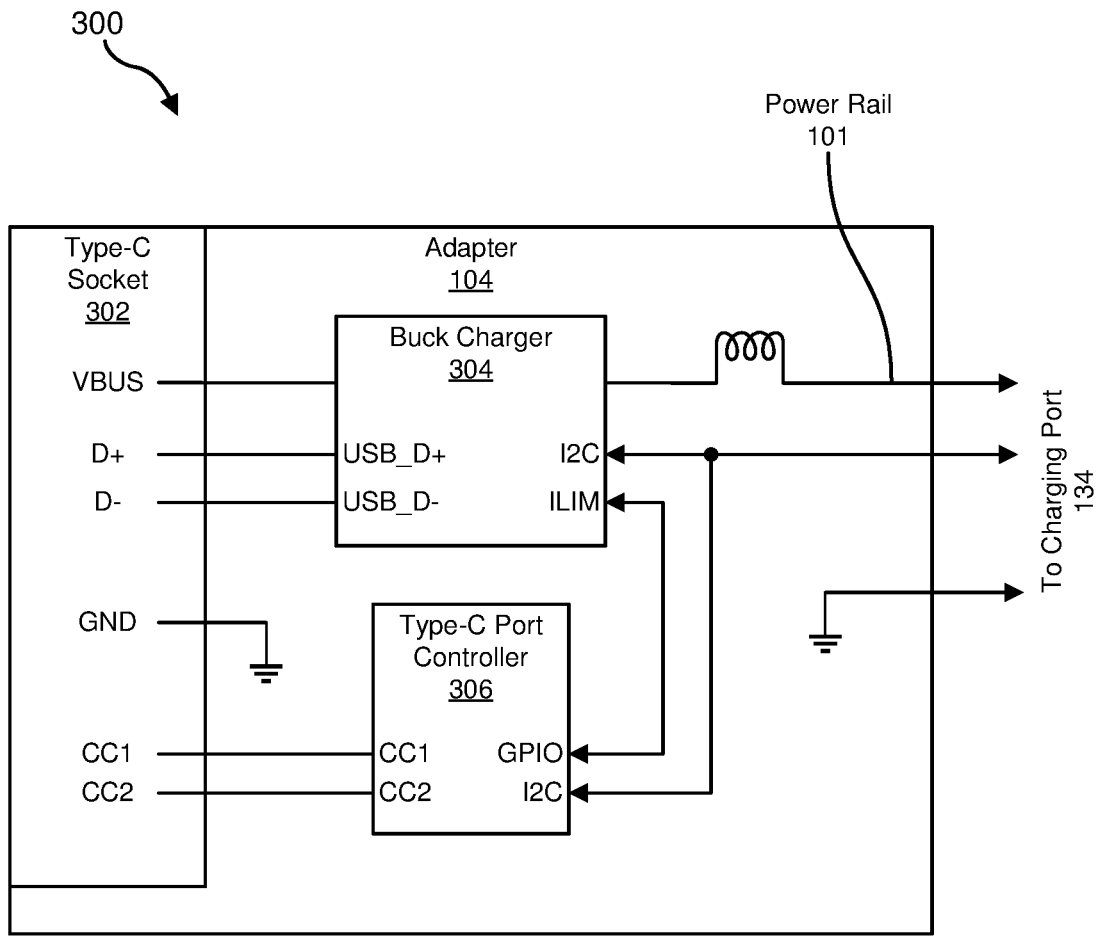
FIG. 3 is a block diagram of an exemplary configuration of the exemplary adapter illustrated in FIG. 1, according to some embodiments.

FIG. 2 is a block diagram of an example configuration 200 of mechanical subassembly 110 illustrated in FIG. 1, and FIG. 3 is a block diagram of an example configuration 300 of charge cable adapter 104 corresponding to configuration 200 of mechanical subassembly 110. In example configuration 200, mechanical subassembly 110 may include an ideal diode 202 that prevents current from flowing from power rail 101 to rail 107, a battery 204 coupled to rail 107, and a linear charger 206 that charges battery 204 via rail 107. Ideal diode 202 may connect battery 204 to power rail 101 and may provide for dynamic power management and load sharing as well as battery protections under various operating scenarios. In some examples, ideal diode 202 may be disabled to isolate power rail 101 from rail 107 (e.g., for reset and shipping-mode features). In this example, linear charger 206 may have an input electrically coupled to power rail 101 and an output electrically coupled to rail 107.

In example configuration 300, charge cable adapter 104 may include a USB type-c socket 302, a buck charger 304, and a USB type-c port controller 306. In some examples, buck charger 304 may include any one or combination of elements needed for providing Output Overvoltage Protection (OVP), Output Undervoltage Protection (UVP), and/or Overcurrent or Current Limit Protection. Buck charger 304 may be used adjust the voltage applied to power rail 101 to minimize the voltage drop across linear charger 206. In some examples, charging subsystem 128 may instruct, via charging port 134, buck charger 304 to adjust the voltage applied to power rail 101 by analog signal or electronically via Inter-Integrated Circuit (I2C) control. When compared to conventional charging topologies, example configuration 300 of charge cable adapter 104 may cause a much larger percentage of the power loss and heat related to charging example apparatus 100 to be dissipated by charge cable adapter 104 rather than example apparatus 100, which may have more stringent thermal requirements. In some examples, port controller 306 may include any one or combination of elements needed for implementing USB type-c and BC1.2 USB charging requirements, which may reduce the pinout requirements for charging port 134 and the overall complexity required in example apparatus 100.

Figure 4:
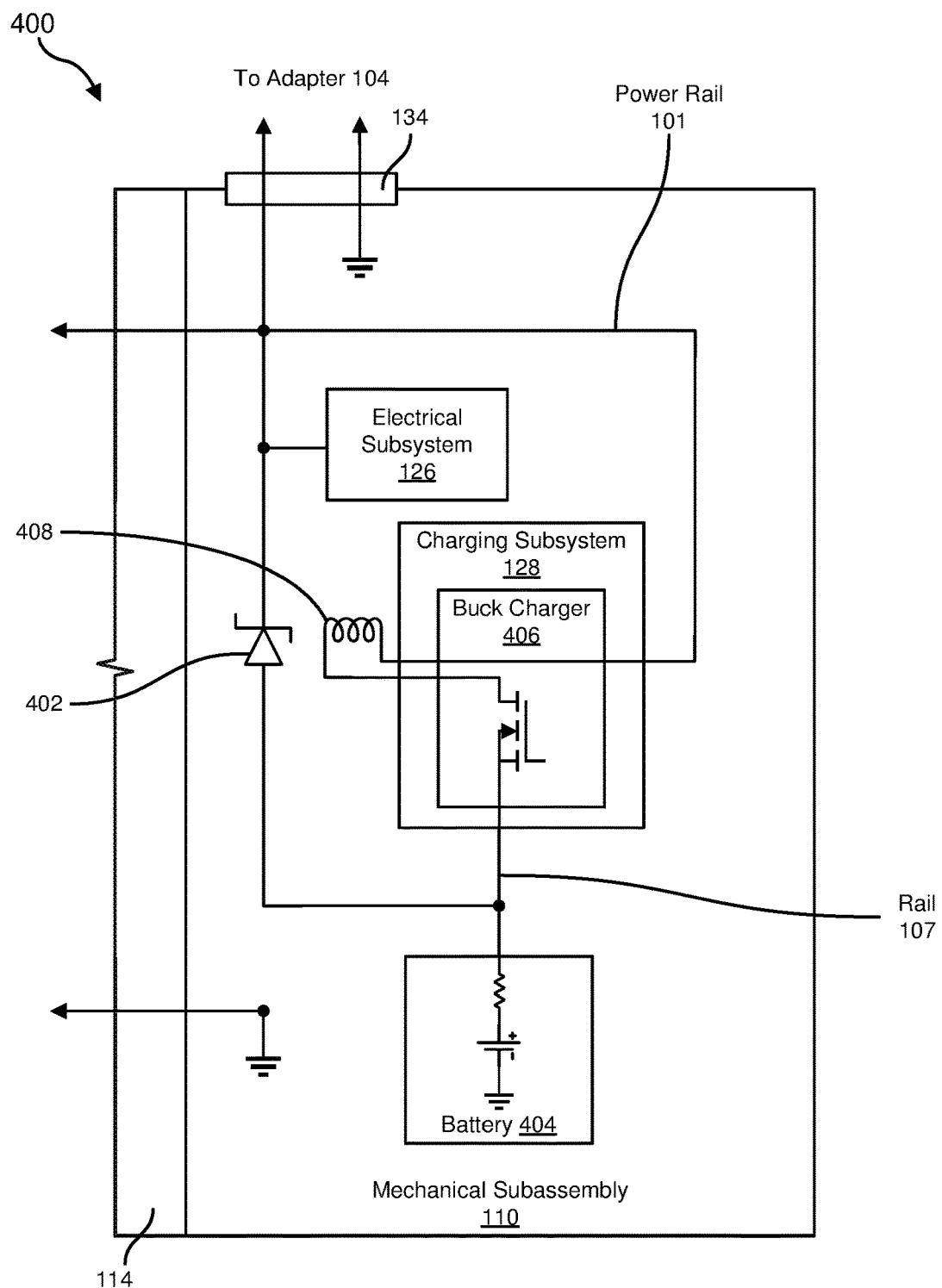
FIG. 4 is a block diagram of another exemplary configuration of some of the components of the exemplary apparatus illustrated in FIG. 1, according to some embodiments.
Figure 5:
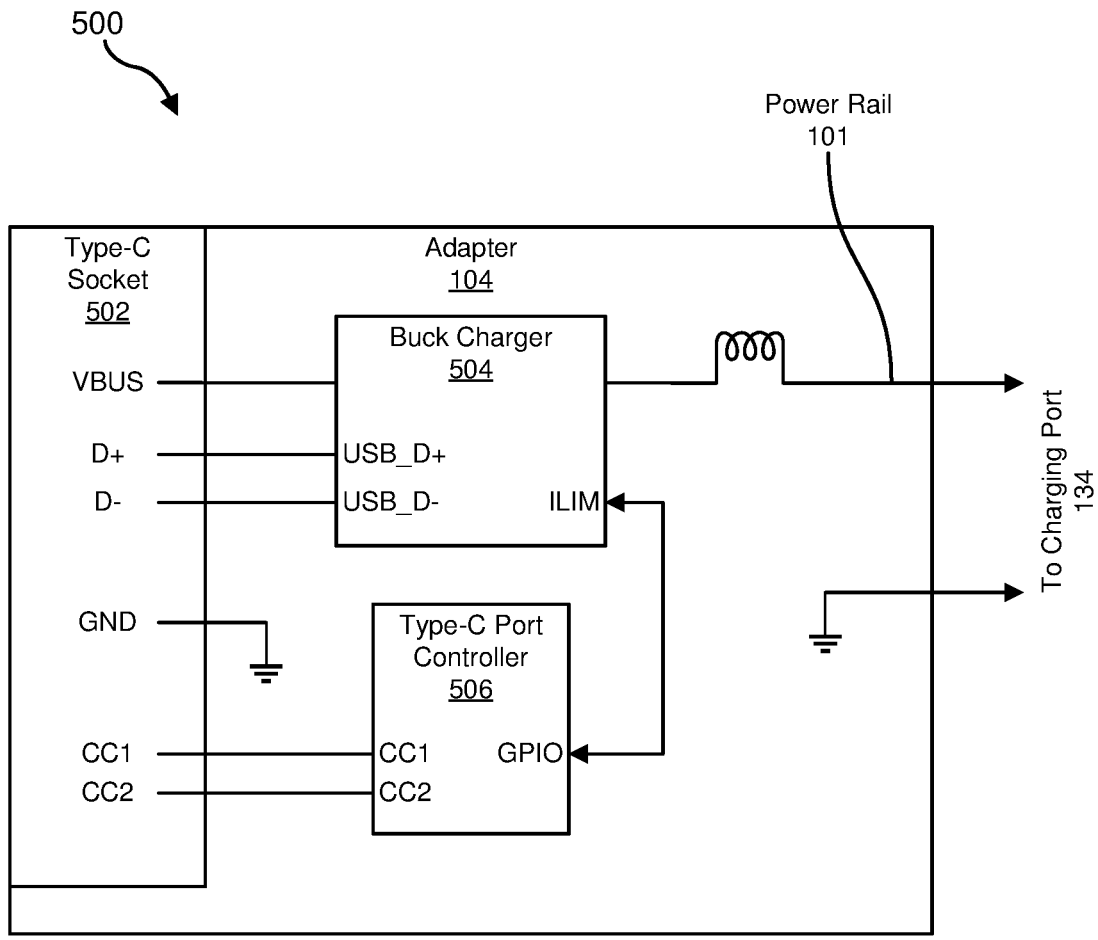
FIG. 5 is a block diagram of another exemplary configuration of the exemplary adapter illustrated in FIG. 1, according to some embodiments.
Figure 6:
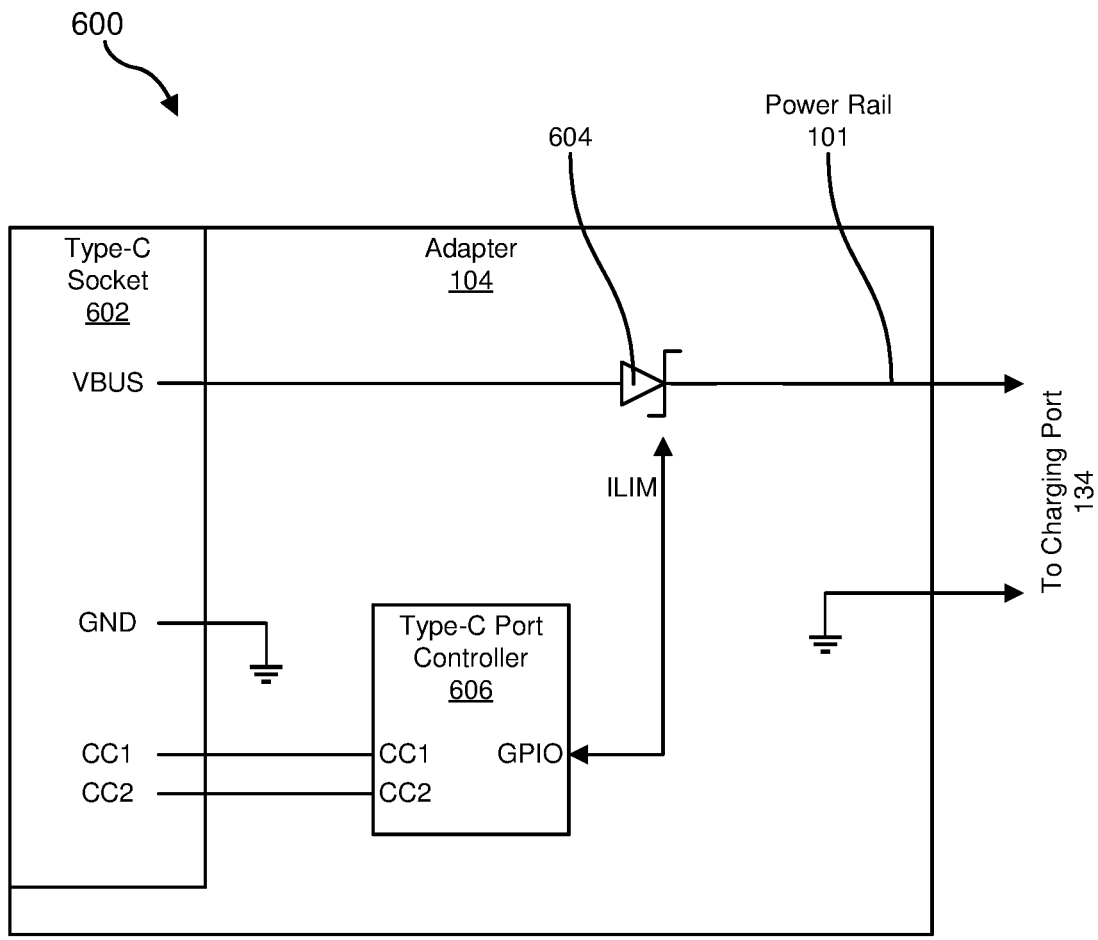
FIG. 6 is a block diagram of another exemplary configuration of the exemplary adapter illustrated in FIG. 1, according to some embodiments.

FIG. 4 is a block diagram of an example configuration 400 of mechanical subassembly 110, and FIGS. 5 and 6 are block diagrams of example configurations 500 and 600, respectively, of charge cable adapter 104 corresponding to configuration 400 of mechanical subassembly 110. In example configuration 400, mechanical subassembly 110 may include an ideal diode 402 that prevents current from flowing from power rail 101 to rail 107, a battery 404 electrically coupled to rail 107, and a buck charger 406, with an associated inductor 408, that charges battery 404 via rail 107. Since buck charger 406 may charge battery 404 without needing to provide system power to power rail 101, inductor 408 may be smaller than the inductors typically used by buck chargers in conventional charging topologies, which may also need to provide system power.

By utilizing a buck charger, as opposed to a linear charger, example configuration 400 of mechanical subassembly 110 may eliminate the need for the battery-voltage monitoring and voltage control mentioned above of power rail 101 by charge cable adapter 104. In example configuration 500, charge cable adapter 104 may include a USB type-c socket 502, a buck charger 504, and a USB type-c port controller 506. In this example, buck charger 504 may output a predetermined or constant voltage to power rail 101 without monitoring the voltage of battery 404. Buck charger 504 may include any one or combination of elements needed for providing Output Overvoltage Protection (OVP), Output Undervoltage Protection (UVP), and/or Overcurrent or Current Limit Protection. In example configuration 600, charge cable adapter 104 may include a USB type-c socket 602, a reverse-current limiter 604, and a USB type-c port controller 606. This embodiment may greatly simplify charge cable adapter 104 and/or the interface of charging port 134.

Figure 7:
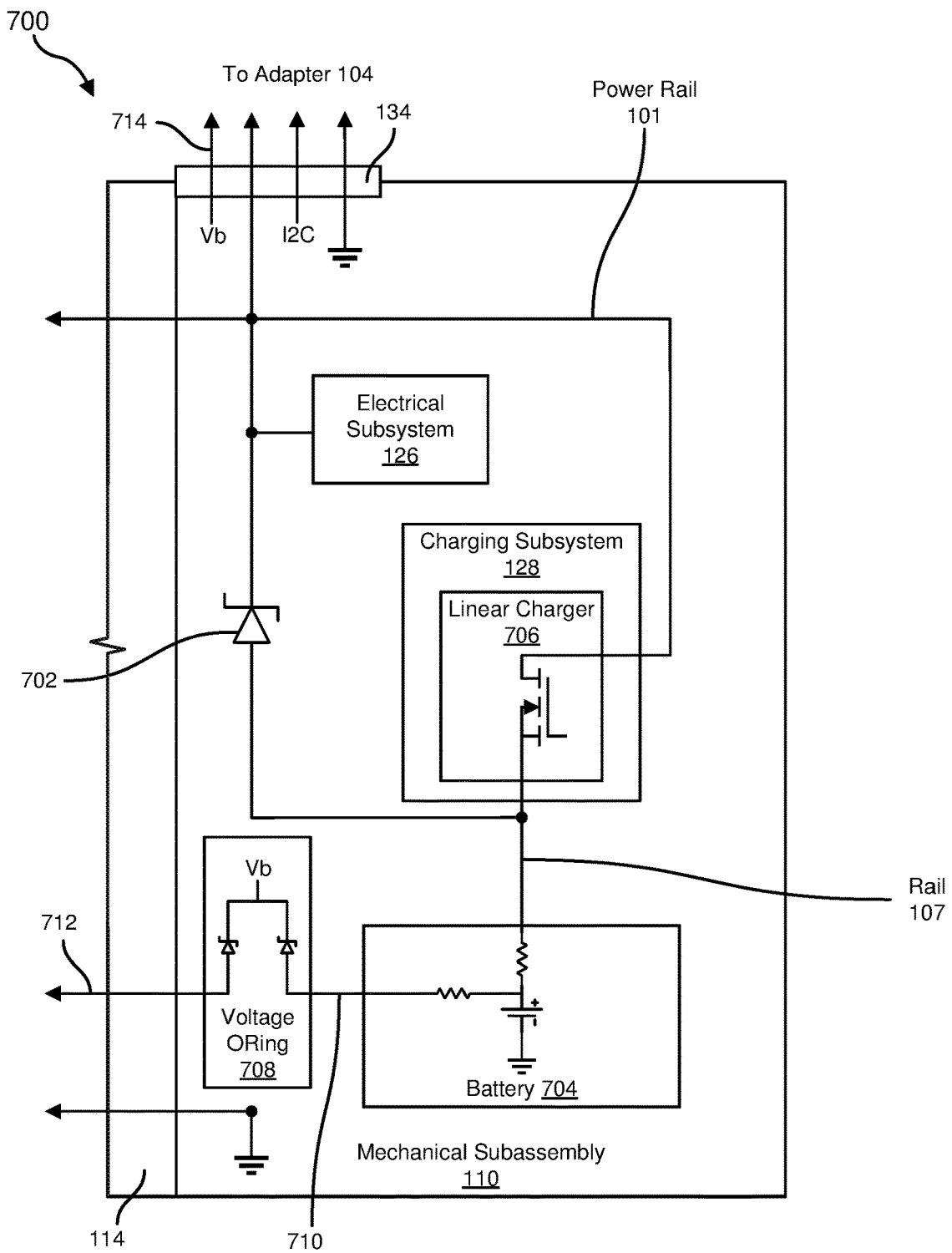
FIG. 7 is a block diagram of another exemplary configuration of some of the components of the exemplary apparatus illustrated in FIG. 1, according to some embodiments.
Figure 8:
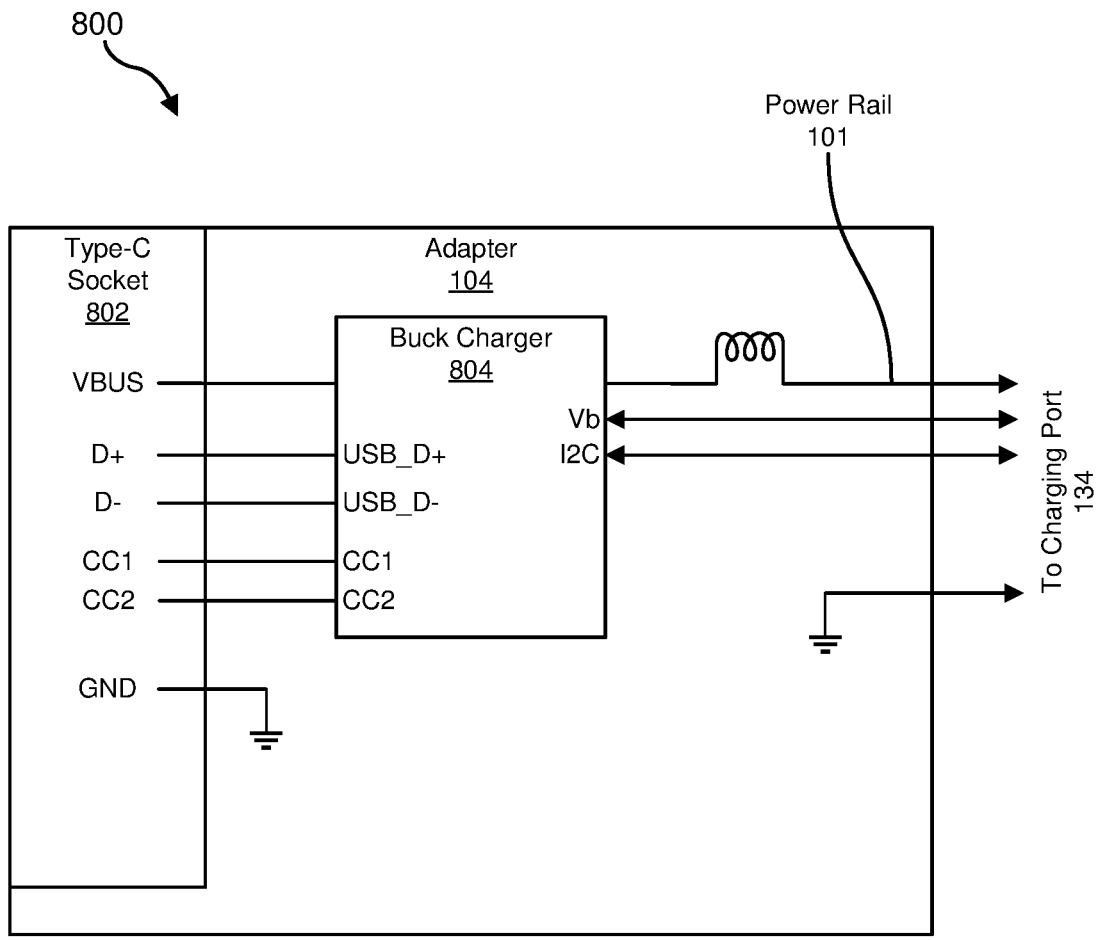
FIG. 8 is a block diagram of another exemplary configuration of the exemplary adapter illustrated in FIG. 1, according to some embodiments.

FIG. 7 is a block diagram of an example configuration 700 of mechanical subassembly 110 illustrated in FIG. 1, and FIG. 8 is a block diagram of an example configuration 800 of charge cable adapter 104 corresponding to configuration 700 of mechanical subassembly 110. In example configuration 700, mechanical subassembly 110 may include an ideal diode 702 that prevents current from flowing from power rail 101 to rail 107, a battery 704 electrically coupled to rail 107, a linear charger 706 having an input electrically coupled to power rail 101 and an output electrically coupled to rail 107, an Voltage ORing component 708 electrically coupled to low-current rails 710 and 712. Voltage ORing component 708 may generate a battery-voltage sense signal (Vb) representing the maximum voltage of any battery from example apparatus 100 by ORing the voltages of low-current rails 710 and 712. The battery-voltage sense signal (Vb) may be communicated to charge cable adapter 104 via low-current rail 714 of charging port 134.

In example configuration 800, charge cable adapter 104 may include a USB type-c socket 802 and a buck charger 804. When compared to conventional charging topologies, example configuration 800 of charge cable adapter 104 may cause a much larger percentage of the power loss and heat related to charging example apparatus 100 to be dissipated by charge cable adapter 104 rather than example apparatus 100, which may have more stringent thermal requirements. To minimize a voltage drop across linear charger 706 (e.g., to reduced power loss and heat generation), buck charger 804 may adjust the voltage applied to power rail 101. In some examples, buck charger 304 may monitor a voltage level of battery 804 through battery-voltage sense signal (Vb) and may regulate power rail 101 at a voltage which optimizes the power loss in example apparatus 100. In at least one example, buck charger 804 may regulate the voltage of power rail 101 at a fixed offset above the voltage of battery-voltage sense signal (Vb) (or the maximum voltage of the batteries of example apparatus 100) and/or no higher than necessary to keep linear charger 706 active.

Figure 9:
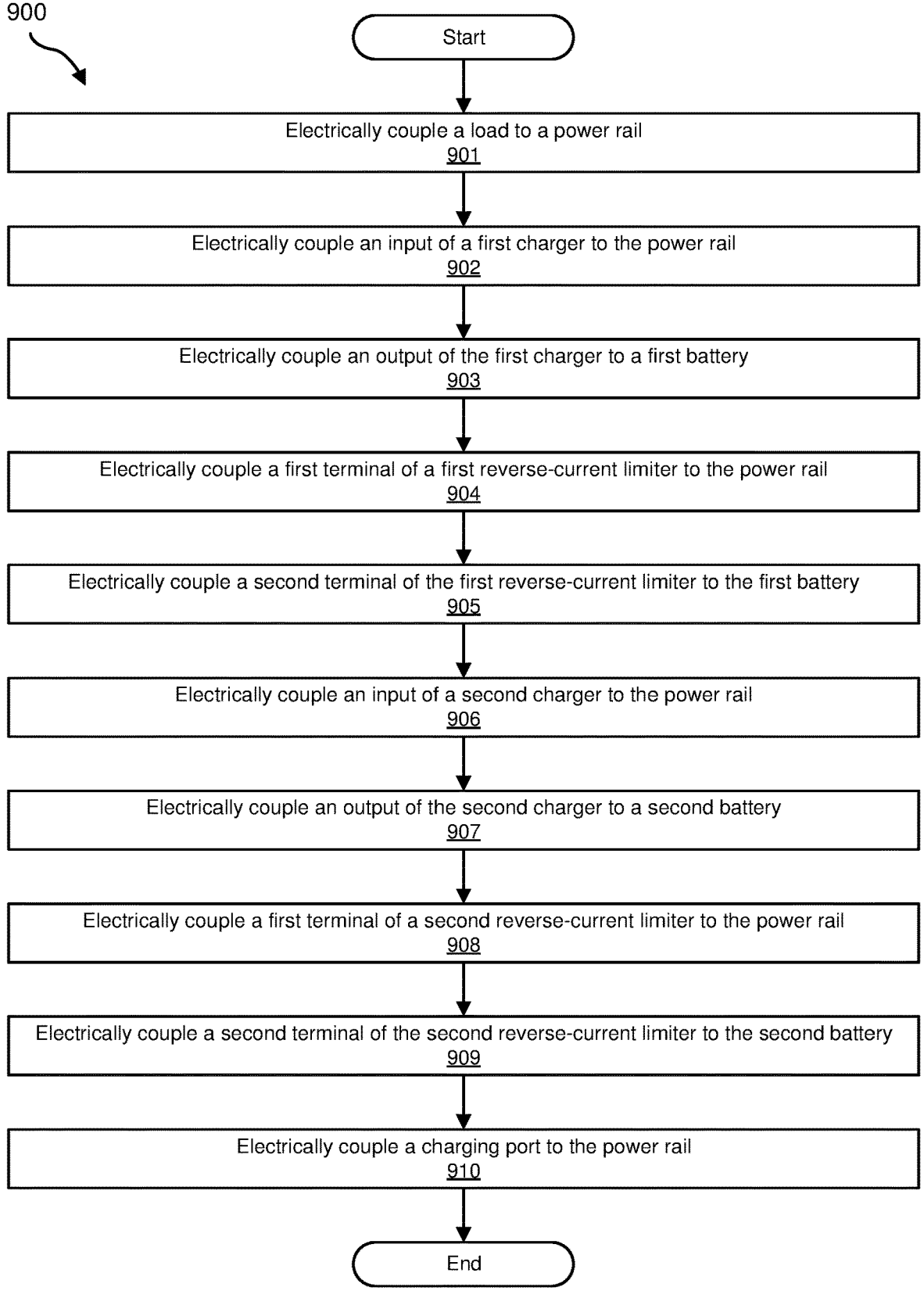
FIG. 9 is a flow diagram of an exemplary method for electrically coupling various components and subsystems to an exemplary power rail, according to some embodiments.

FIG. 9 is a flow diagram of an exemplary method 900 for assembling or manufacturing a distributed-charging apparatus according to any of the embodiments disclosed herein. The steps shown in FIG. 9 may be performed by an individual and/or by any suitable manual and/or automated apparatus. As illustrated in FIG. 9, at step 901, an electrical load may be electrically coupled to a power rail. At step 902, an input of a first charger may be electrically coupled to the power rail. At step 903, an output of the first charger may be electrically coupled to a first battery. At step 904, a first terminal of a first reverse-current limiter may be electrically coupled to the power rail. At step 905, a second terminal of the first reverse-current limiter may be electrically coupled to the first battery. At step 906, an input of a second charger may be electrically coupled to the power rail. At step 907, an output of the second charger may be electrically coupled to a second battery. At step 908, a first terminal of a second reverse-current limiter may be electrically coupled to the power rail. At step 909, a second terminal of the second reverse-current limiter may be electrically coupled to the second battery. At step 910, a charging port may be electrically coupled to the power rail.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 1000 in FIG. 10. Other artificial-reality systems may include an NED that also provides visibility into the real world (e.g., augmented-reality system 1100 in FIG. 11) or that visually immerses a user in an artificial reality (e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
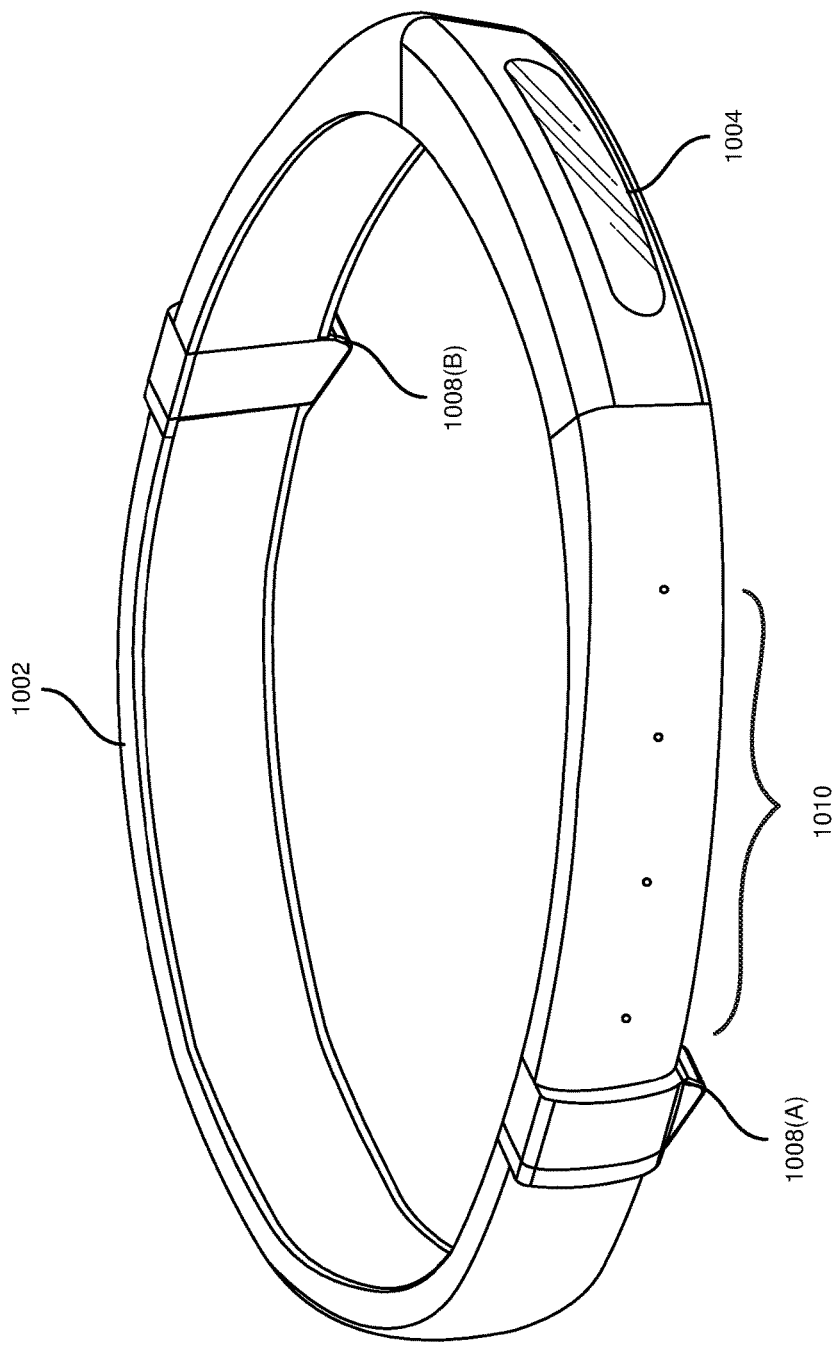
FIG. 10 is an illustration of an exemplary artificial-reality headband that may be used in connection with embodiments of this disclosure.

Turning to FIG. 10, augmented-reality system 1000 generally represents a wearable device dimensioned to fit about a body part (e.g., a head) of a user. As shown in FIG. 10, system 1000 may include a frame 1002 and a camera assembly 1004 that is coupled to frame 1002 and configured to gather information about a local environment by observing the local environment. Augmented-reality system 1000 may also include one or more audio devices, such as output audio transducers 1008(A) and 1008(B) and input audio transducers 1010. Output audio transducers 1008(A) and 1008(B) may provide audio feedback and/or content to a user, and input audio transducers 1010 may capture audio in a user's environment.

As shown, augmented-reality system 1000 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1000 may not include an NED, augmented-reality system 1000 may include other types of screens or visual feedback devices (e.g., a display screen integrated into a side of frame 1002).

Figure 11:
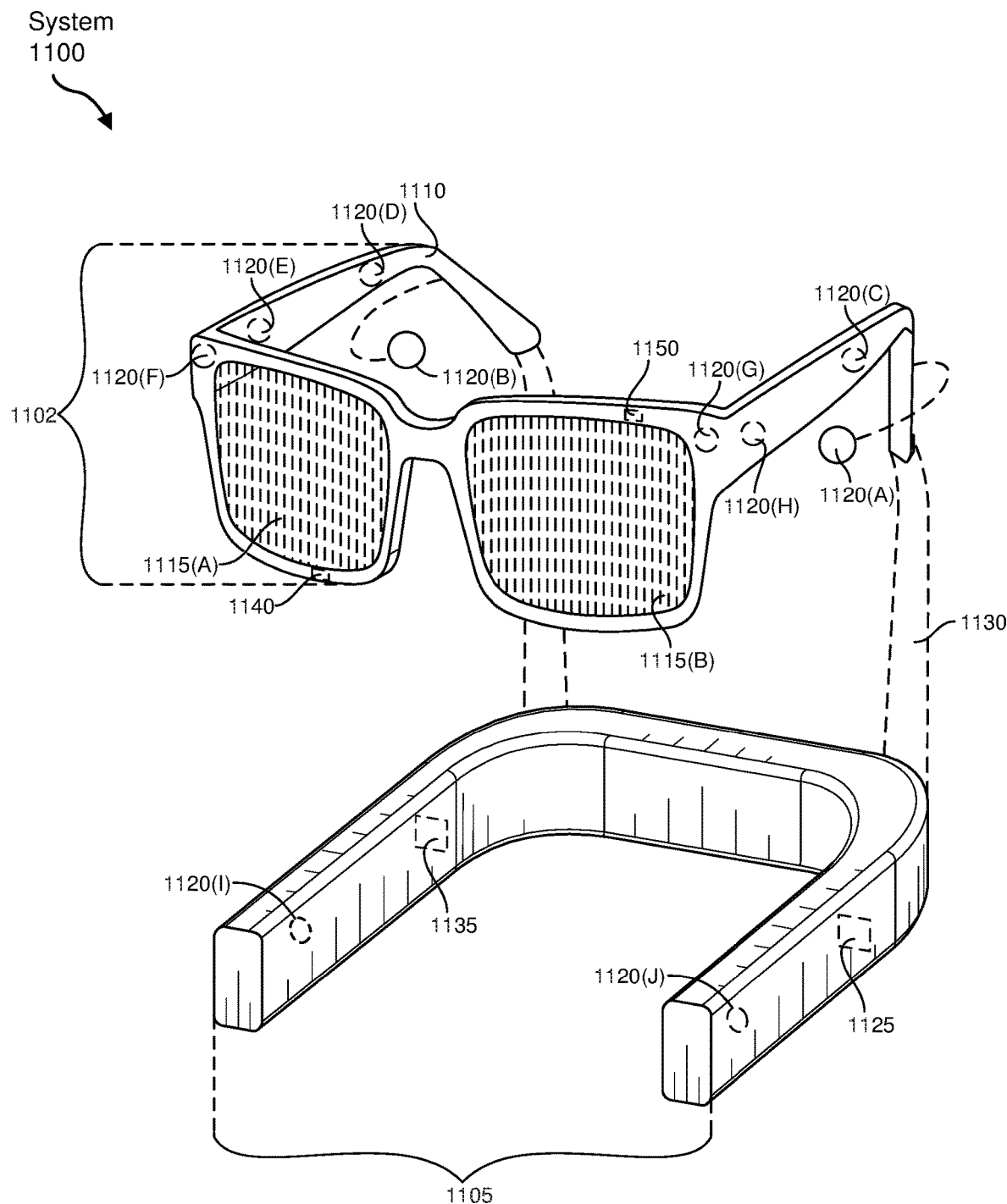
FIG. 11 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent a position sensor, an inertial measurement unit (IMU), a depth camera assembly, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof. Augmented-reality system 1100 may also include a microphone array with a plurality of acoustic transducers 1120(A)-1120(J), referred to collectively as acoustic transducers 1120. Acoustic transducers 1120 may be transducers that detect air pressure variations induced by sound waves. Each acoustic transducer 1120 may be configured to detect sound and convert the detected sound into an electronic format (e.g., an analog or digital format). The microphone array in FIG. 2 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(1) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments, acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned along the length of the temples, across the bridge, above or below display devices 1115(A) and 1115(B), or some combination thereof. Acoustic transducers 1120 may be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers and other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(1) and 1120(J)) that are part of the microphone array (or potentially form their own microphone subarray). Neckband 1105 may also include a controller 1125 and a power source 1135.

Acoustic transducers 1120(1) and 1120(J) of neckband 1105 may be configured to detect sound and convert the detected sound into an electronic format (analog or digital). In the embodiment of FIG. 11, acoustic transducers 1120(1) and 1120(J) may be positioned on neckband 1105, thereby increasing the distance between the neckband acoustic transducers 1120(1) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

Figure 12:
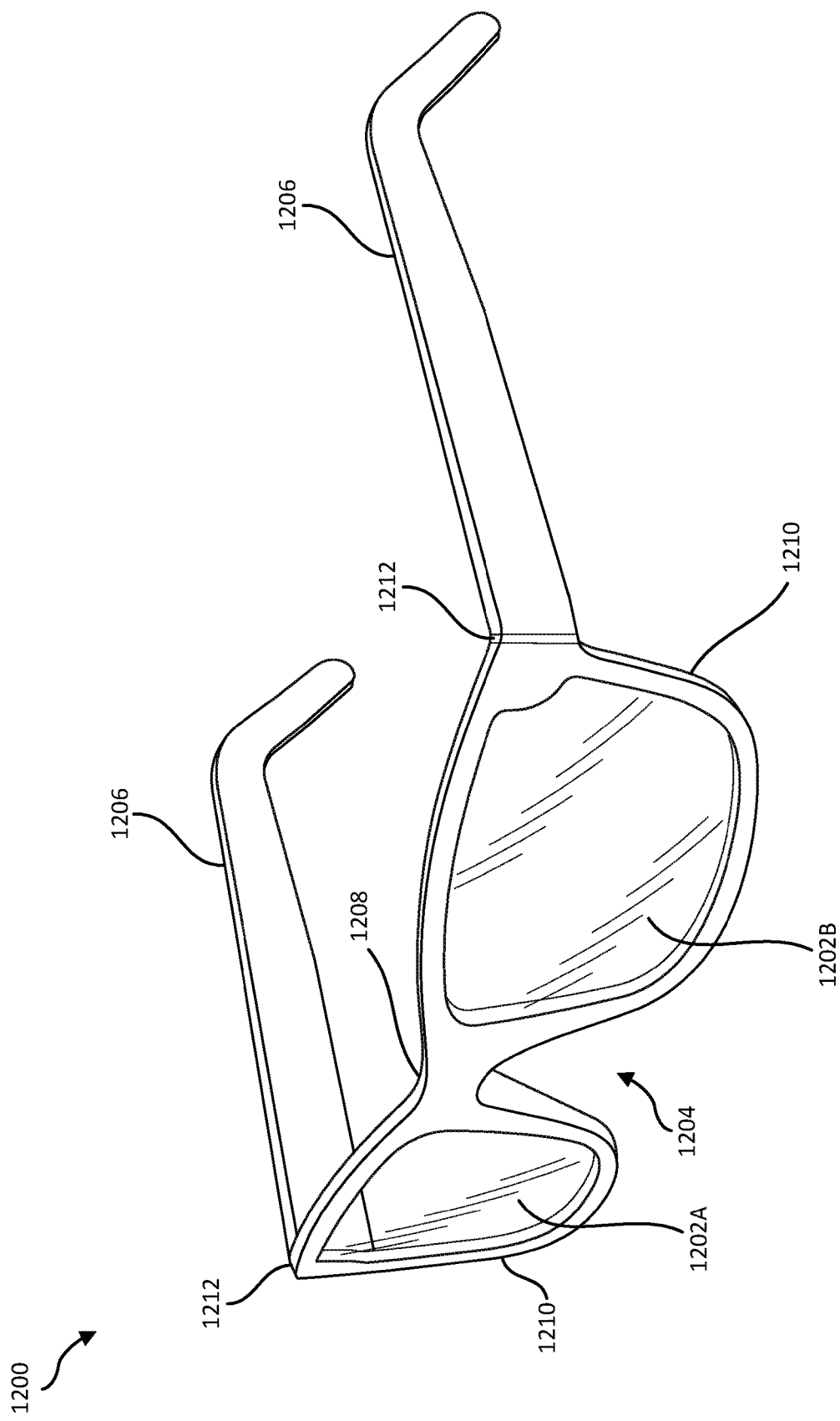
FIG. 12 is a perspective view of an exemplary head-mounted display device in accordance with some embodiments.

FIG. 12 is an illustration of a head-mounted display device 1200 according to some embodiments. The depicted embodiment includes a right near-eye display 1202A and a left near-eye display 1202B, which are collectively referred to as near-eye displays 1202. Near-eye displays 1202 may be transparent or semi-transparent lenses that include or utilize a display system (e.g., a projection display system) to present media to a user. Examples of media presented by near-eye displays 1202 include one or more images, a series of images (e.g., a video), audio, or some combination thereof. Near-eye displays 1202 may be configured to operate as an augmented-reality near-eye display, such that a user can see media projected by near-eye displays 1202 and see the real-world environment through near-eye displays 1202. However, in some embodiments, near-eye displays 1202 may be modified to also operate as virtual-reality near-eye displays, mixed-reality near-eye displays, or some combination thereof. Accordingly, in some embodiments, near-eye displays 1202 may augment views of a physical, real-world environment with computer-generated elements (e.g., images, video, sound, etc.).

Head-mounted-display device 1200 may additionally or alternatively include various other electrical components and/or subsystems, including, for example, directional speakers to provide audio to a user, bone conduction transducers for providing sound signals to a user via vibrational bone conduction in an auditory region of the user's head, tracking and/or recording cameras, passive and/or active front and/or rear facing cameras to capture images from the user's environment, eye tracking cameras, ambient light, night vision, and/or thermal imaging sensors, multimode connectivity antennas for wireless communication, audio microphones for capturing sound in the user's environment, lights for illuminating a user's environment, inertial, haptic, environmental, and/or health monitoring sensors, and/or any other suitable components, without limitation.

As shown in FIG. 12, head-mounted display device 1200 may include a support or front frame 1204 that secures near-eye displays 1202 in place on the head of a user, in embodiments in which near-eye displays 1202 includes separate left and right displays. In some embodiments, front frame 1204 may be a front frame of eye-wear glasses. In some examples, front frame 1204 may be mechanically coupled (e.g., by mechanical hinges 1212) to temples 1206 configured to rest on the top of and/or behind a user's ears.

As shown, front frame 1204 may include a bridge 1208 configured to rest on the top of the bridge of a user's nose and rims 1210 sized and configured to rest on or against a user's cheeks. In various embodiments, front frame 1204 and/or one or more of temples 1206 may include or integrate an energy-storing component and its associated charging subsystem and/or one or more electronic subsystems all connected by a single power rail that is integrated across one or more of hinges 1212.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 1100 and/or virtual-reality system 1300 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1100 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1000, augmented-reality system 1100, and/or virtual-reality system 1300 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 10 and 13, output audio transducers 1008(A), 1008(B), 1306(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1010 may include condenser microphones, dynamic microphones, ribbon microphones, and/or any other type or form of input transducer. In some embodiments, a single transducer may be used for both audio input and audio output.

While not shown in FIGS. 10-13, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 1000, 1100, and 1300 may be used with a variety of other types of devices to provide a more compelling artificial-reality experience.

These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 14:
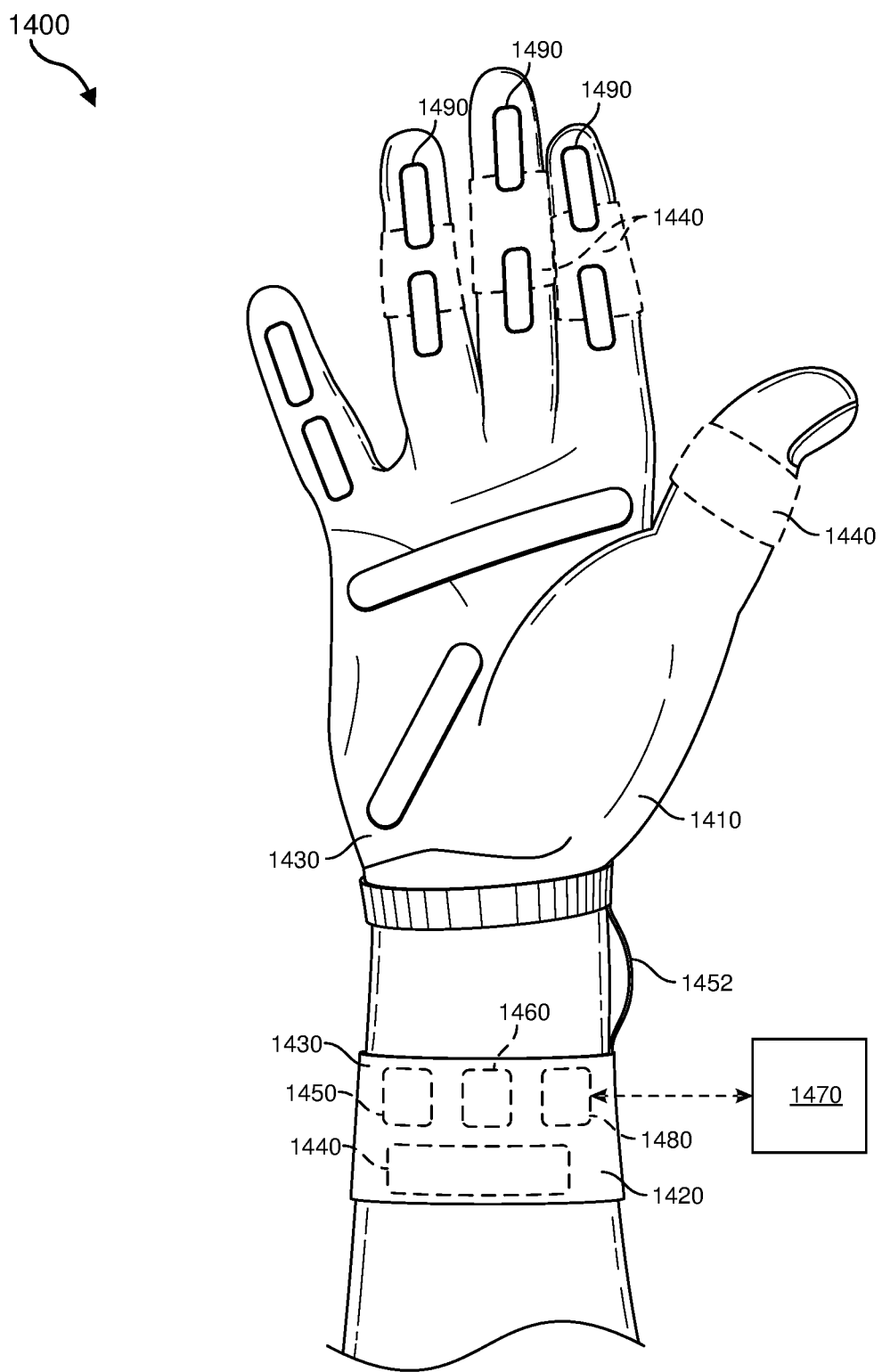
FIG. 14 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a wearable glove (haptic device 1410) and wristband (haptic device 1420). Haptic device 1410 and haptic device 1420 are shown as examples of wearable devices that include a flexible, wearable textile material 1430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, Bluetooth, cellular, radio, etc.) link or a wired link. If present, communications interface 1480 may be in communication with processor 1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, the present disclosure is not so limited. For example, one or more of power source 1450, processor 1460, or communications interface 1480 may be positioned within haptic device 1410 or within another wearable textile.

Figure 15:
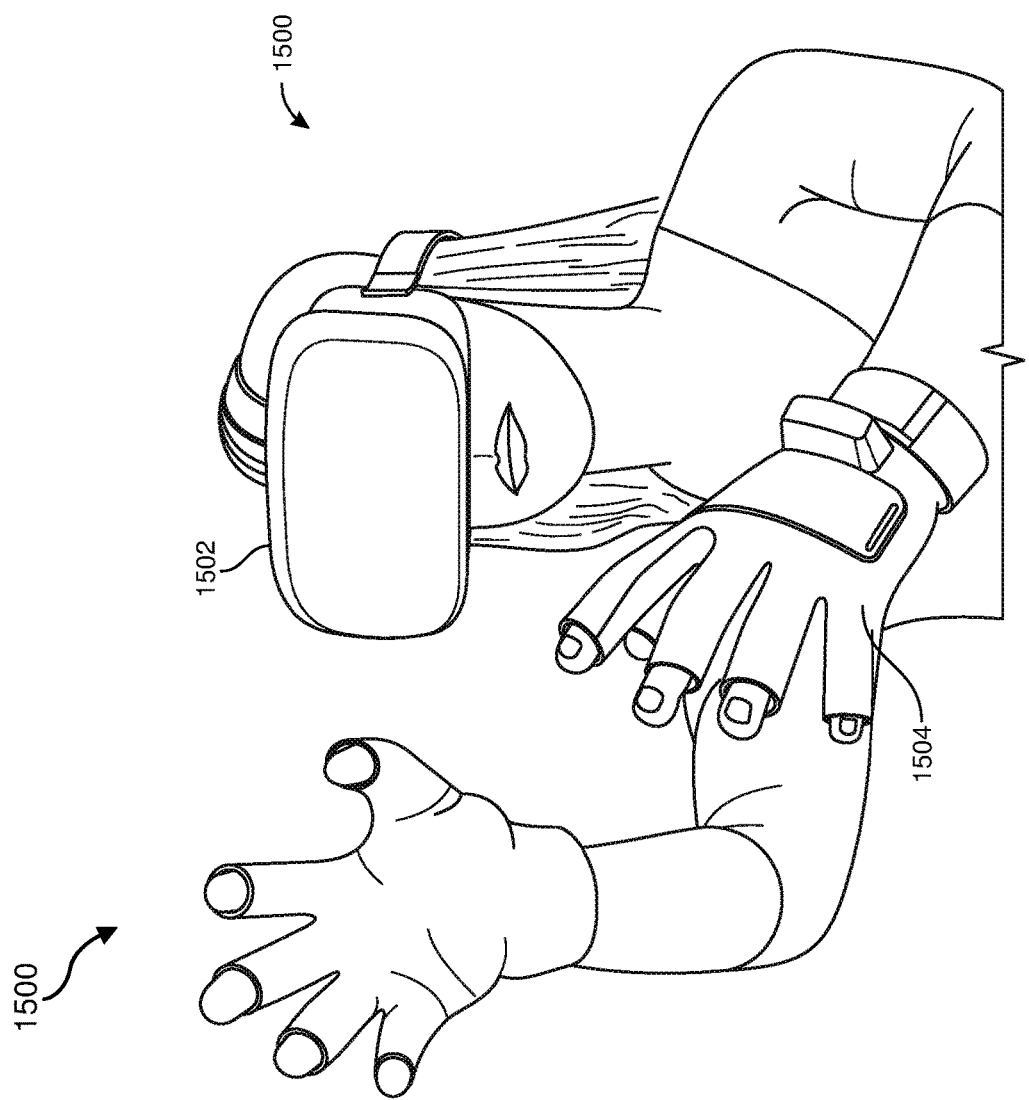
FIG. 15 is an illustration of an exemplary virtual-reality environment according to embodiments of this disclosure.

Haptic wearables, such as those shown in and described in connection with FIG. 14, may be implemented in a variety of types of artificial-reality systems and environments. FIG. 15 shows an example artificial-reality environment 1500 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 13:
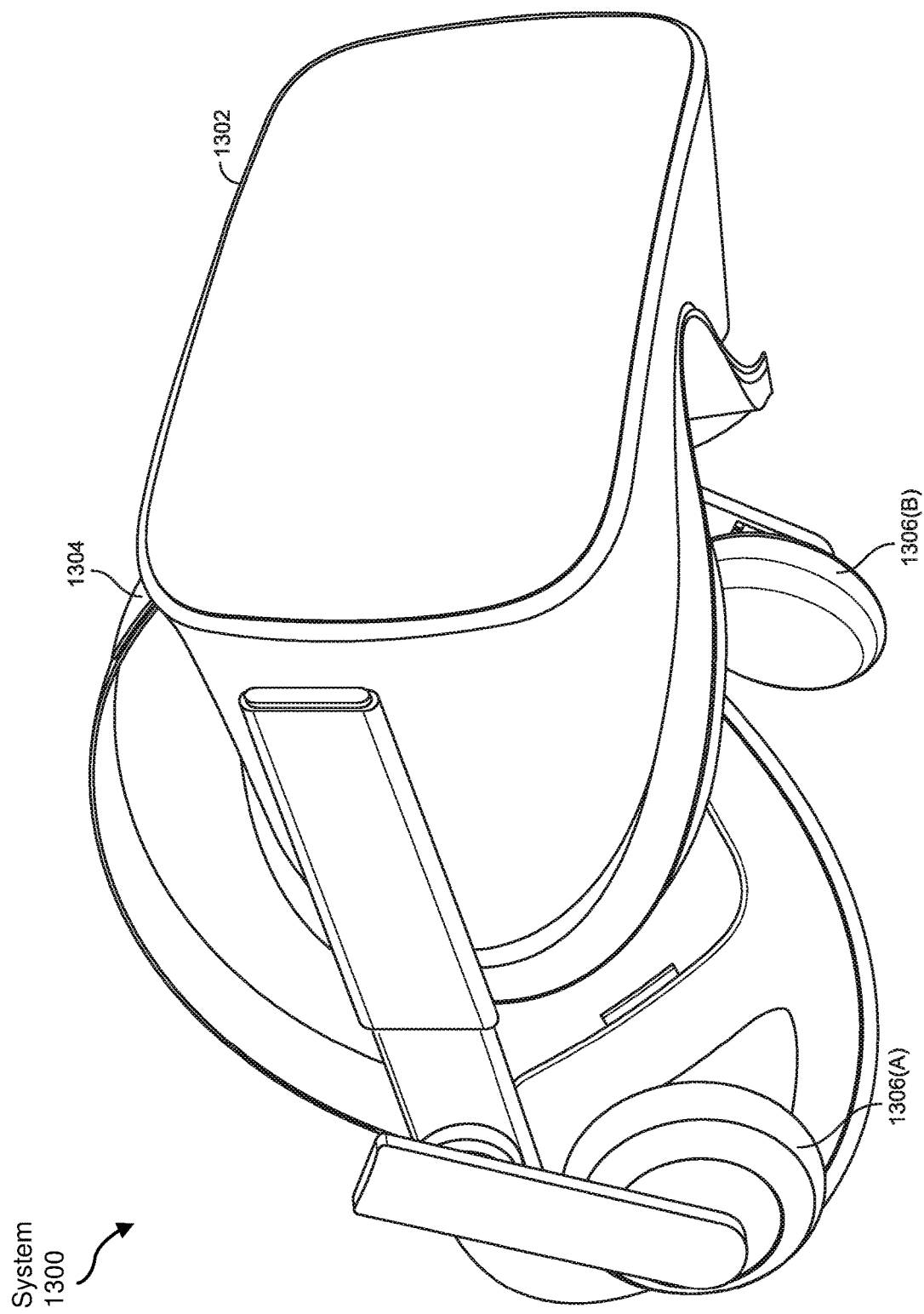
FIG. 13 is an illustration of an exemplary virtual-reality headset that may be used in connection with embodiments of this disclosure.

Head-mounted display 1502 generally represents any type or form of virtual-reality system, such as virtual-reality system 1300 in FIG. 13. Haptic device 1504 generally represents any type or form of wearable device, worn by a user of an artificial-reality system, that provides haptic feedback to the user to give the user the perception that he or she is physically engaging with a virtual object. In some embodiments, haptic device 1504 may provide haptic feedback by applying vibration, motion, and/or force to the user. For example, haptic device 1504 may limit or augment a user's movement. To give a specific example, haptic device 1504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1504 to send action requests to a console. Examples of action requests include, without limitation, requests to start an application and/or end the application and/or requests to perform a particular action within the application.

Figure 16:
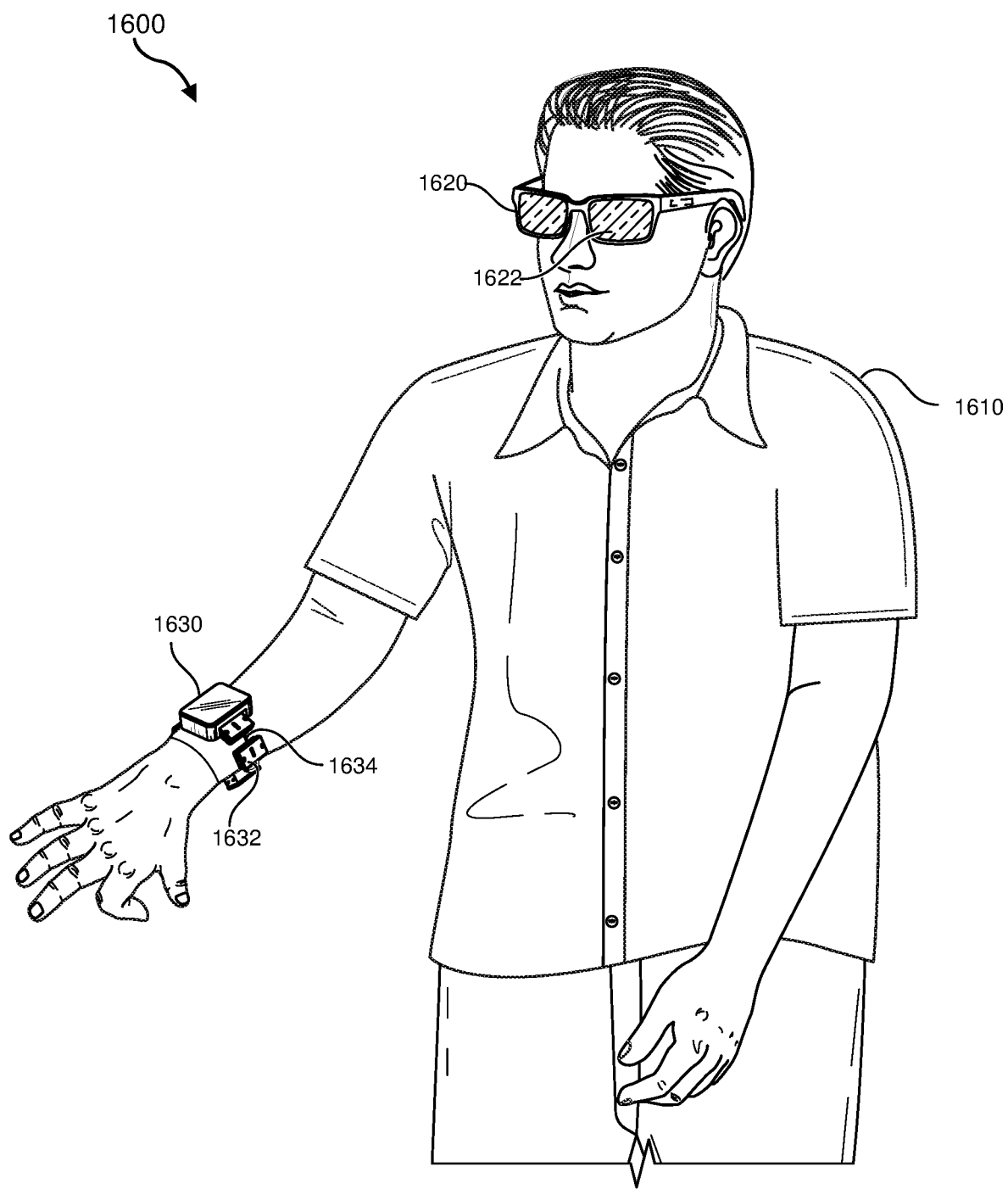
FIG. 16 is an illustration of an exemplary augmented-reality environment according to embodiments of this disclosure.

While haptic interfaces may be used with virtual-reality systems, as shown in FIG. 15, haptic interfaces may also be used with augmented-reality systems, as shown in FIG. 16. FIG. 16 is a perspective view of a user 1610 interacting with an augmented-reality system 1600. In this example, user 1610 may wear a pair of augmented-reality glasses 1620 that may have one or more displays 1622 and that are paired with a haptic device 1630. In this example, haptic device 1630 may be a wristband that includes a plurality of band elements 1632 and a tensioning mechanism 1634 that connects band elements 1632 to one another.

One or more of band elements 1632 may include any type or form of actuator suitable for providing haptic feedback. For example, one or more of band elements 1632 may be configured to provide one or more of various types of cutaneous feedback, including vibration, force, traction, texture, and/or temperature. To provide such feedback, band elements 1632 may include one or more of various types of actuators. In one example, each of band elements 1632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 1504, and 1630 may include any suitable number and/or type of haptic transducer, sensor, and/or feedback mechanism. For example, haptic devices 1410, 1420, 1504, and 1630 may include one or more mechanical transducers, piezoelectric transducers, and/or fluidic transducers. Haptic devices 1410, 1420, 1504, and 1630 may also include various combinations of different types and forms of transducers that work together or independently to enhance a user's artificial-reality experience. In one example, each of band elements 1632 of haptic device 1630 may include a vibrotactor (e.g., a vibrotactile actuator) configured to vibrate in unison or independently to provide one or more of various types of haptic sensations to a user.

EXAMPLE EMBODIMENTS

Example 1: An apparatus may include a power rail, a subassembly, an additional subassembly, and an interface coupling the subassembly to the additional subassembly. The subassembly may include a load, an energy-storing component, a charger having an output electrically coupled to the energy-storing component, and a reverse-current limiter having a first terminal and a second terminal electrically coupled to the energy-storing component. The additional subassembly may include an additional energy-storing component, an additional charger having an output electrically coupled to the additional energy-storing component, and an additional reverse-current limiter having a first terminal and a second terminal electrically coupled to the additional energy-storing component. The power rail may cross the interface and may electrically couple the load, an input of the charger, the first terminal of the reverse-current limiter, an input of the additional charger, and the first terminal of the additional reverse-current limiter.

Example 2: The apparatus of Example 1, wherein (1) the reverse-current limiter may be operable to substantially prevent current from flowing from the power rail to the energy-storing component, (2) the additional reverse-current limiter may be operable to substantially prevent current from flowing from the power rail to the additional energy-storing component, (3) the reverse-current limiter may be operable to independently enable current to flow from the energy-storing component to the power rail when a voltage of the power rail is less than a voltage of the energy-storing component, and (4) the additional reverse-current limiter may be operable to independently enable current to flow from the additional energy-storing component to the power rail when the voltage of the power rail is less than a voltage of the additional energy-storing component.

Example 3: The apparatus of any of Examples 1 and 2, wherein (1) the reverse-current limiter may be operable to enable current to flow from the energy-storing component to the power rail when a voltage of the power rail is less than a first predetermined threshold and (2) the additional reverse-current limiter may be operable to enable current to flow from the additional energy-storing component to the power rail when the voltage of the power rail is less than a second predetermined threshold.

Example 4: The apparatus of any of Examples 1-3, wherein the reverse-current limiter and the additional reverse-current limiter are ideal diodes.

Example 5: The apparatus of any of Examples 1-4, wherein the additional subassembly further includes an additional load and the power rail may be electrically coupled to the additional load.

Example 6: The apparatus of any of Examples 1-5, wherein the reverse-current limiter is operable to limit an output current flowing from the energy-storing component to the power rail and the additional reverse-current limiter is operable to limit an output current flowing from the additional energy-storing component to the power rail.

Example 7: The apparatus of any of Examples 1-6, wherein the subassembly may be an eyewear front frame, the additional subassembly may be an eyewear temple, and the interface may be an eyewear hinge.

Example 8: The apparatus of any of Examples 1-7, wherein the subassembly may be a watch case, and the additional subassembly may be a watch band.

Example 9: The apparatus of any of Examples 1-8, wherein the energy-storing component may be a battery and the additional energy-storing component may be a supercapacitor.

Example 10: The apparatus of any of Examples 1-9, wherein the energy-storing component and the additional energy-storing component are batteries having the same voltage and different cell configurations, different number of cells, different chemistries, and/or different capacities.

Example 11: A system may include a power-supply adapter and a battery-powered device. The battery-powered device may include a power port, a power rail, a subassembly, an additional subassembly, and a mechanical interface coupling the subassembly to the additional subassembly. The subassembly may include a load, a battery, a charger having an output electrically coupled to the battery, and a reverse-current limiter having (1) a first terminal and (2) a second terminal electrically coupled to the battery. The additional subassembly may include an additional battery, an additional charger having an output electrically coupled to the additional battery, and an additional reverse-current limiter having (1) a first terminal and (2) a second terminal electrically coupled to the additional battery. The power rail may cross the power port and the mechanical interface and may electrically couple the power-supply adapter, the load, an input of the charger, the first terminal of the reverse-current limiter, an input of the additional charger, and the first terminal of the additional reverse-current limiter.

Example 12: The system of Example 11, wherein the charger and the additional charger are linear chargers.

Example 13: The system of Example 12, wherein the power-supply adapter includes a buck charger that regulates a voltage of the power rail in order to minimize heat loss caused by voltage drops across the linear chargers.

Example 14: The system of Example 13, wherein the battery-powered device further includes a sensing wire operable to relay a voltage of the battery to the buck charger and an additional sensing wire operable to relay a voltage of the additional battery to the buck charger. The sensing wire or the additional sensing wire may cross the mechanical interface.

Example 15: The system of Example 13, wherein the battery-powered device further includes a voltage-ORing component operable to relay a maximum battery voltage to the buck charger, a sensing wire operable to relay a voltage of the battery to the voltage-ORing component, and an additional sensing wire operable to relay a voltage of the additional battery to the voltage-ORing component. The sensing wire or the additional sensing wire may cross the mechanical interface.

Example 16: The system of any of Examples 11-15, wherein the subassembly may be an eyewear front frame, the additional subassembly may be an eyewear temple, and the mechanical interface may be an eyewear hinge.

Example 17: The system of Examples 11-15, wherein the subassembly may be a watch case and the additional subassembly may be a watch band.

Example 18: The system of Examples 11-17, wherein the reverse-current limiter and the additional reverse-current limiter are ideal diodes.

Example 19: The system of Examples 11-18, wherein the additional subassembly further includes an additional load and the battery-powered device further includes a third subassembly and an additional mechanical interface coupling the subassembly to the third subassembly. The third subassembly may include a third load, a third battery, a third charger having an output electrically coupled to the third battery, and a third reverse-current limiter having a first terminal and a second terminal electrically coupled to the third battery. The power rail may cross the additional mechanical interface and may further electrically couple the additional load, the third load, an input of the third charger, and the first terminal of the third reverse-current limiter.

Example 20: A method may include (1) electrically coupling a load to a power rail, (2) electrically coupling an input of a first charger to the power rail, (3) electrically coupling an output of the first charger to a first battery, (4) electrically coupling a first terminal of a first reverse-current limiter to the power rail, (5) electrically coupling a second terminal of the first reverse-current limiter to the first battery, (6) electrically coupling an input of a second charger to the power rail, (7) electrically coupling an output of the second charger to a second battery, (8) electrically coupling a first terminal of a second reverse-current limiter to the power rail, (9) electrically coupling a second terminal of the second reverse-current limiter to the second battery, and (10) electrically coupling a charging port to the power rail.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a power rail;
   a subassembly comprising:
     a load;
     an energy-storing component;
     a charger having an output electrically coupled to the energy-storing component; and
     a reverse-current limiter having:
       a first terminal; and
       a second terminal electrically coupled to the energy-storing component;
   an additional subassembly comprising:
     an additional energy-storing component;
     an additional charger having an output electrically coupled to the additional energy-storing component; and
     an additional reverse-current limiter having:
       a first terminal; and
       a second terminal electrically coupled to the additional energy-storing component; and
   an interface coupling the subassembly to the additional subassembly, wherein the power rail crosses the interface and electrically couples the load, an input of the charger, the first terminal of the reverse-current limiter, an input of the additional charger, and the first terminal of the additional reverse-current limiter.

2. The apparatus of claim 1, wherein:
   the reverse-current limiter is operable to substantially prevent current from flowing from the power rail to the energy-storing component;
   the additional reverse-current limiter is operable to substantially prevent current from flowing from the power rail to the additional energy-storing component;
   the reverse-current limiter is operable to independently enable current to flow from the energy-storing component to the power rail when a voltage of the power rail is less than a voltage of the energy-storing component; and
   the additional reverse-current limiter is operable to independently enable current to flow from the additional energy-storing component to the power rail when the voltage of the power rail is less than a voltage of the additional energy-storing component.

3. The apparatus of claim 1, wherein:
   the reverse-current limiter is operable to enable current to flow from the energy-storing component to the power rail when a voltage of the power rail is less than a first predetermined threshold; and
   the additional reverse-current limiter is operable to enable current to flow from the additional energy-storing component to the power rail when the voltage of the power rail is less than a second predetermined threshold.

4. The apparatus of claim 1, wherein the reverse-current limiter and the additional reverse-current limiter are ideal diodes.

5. The apparatus of claim 1, wherein:
the additional subassembly further comprises an additional load; and
the power rail is further electrically coupled to the additional load.

6. The apparatus of claim 1, wherein:
the reverse-current limiter is operable to limit an output current flowing from the energy-storing component to the power rail; and
the additional reverse-current limiter is operable to limit an output current flowing from the additional energy-storing component to the power rail.

7. The apparatus of claim 1, wherein:
the subassembly is an eyewear front frame;
the additional subassembly is an eyewear temple; and
the interface is an eyewear hinge.

8. The apparatus of claim 1, wherein:
the subassembly is a watch case; and
the additional subassembly is a watch band.

9. The apparatus of claim 1, wherein:
the energy-storing component is a battery; and
the additional energy-storing component is a supercapacitor.

10. The apparatus of claim 1, wherein the energy-storing component and the additional energy-storing component are batteries having the same voltage and at least one of:
different cell configurations;
different number of cells;
different chemistries; or
different capacities.

11. A system comprising:
a power-supply adapter; and
a battery-powered device comprising:
a power port;
a subassembly comprising:
a load;
a battery;
a charger having an output electrically coupled to the battery; and
a reverse-current limiter having:
a first terminal; and
a second terminal electrically coupled to the battery;
an additional subassembly comprising:
an additional battery;
an additional charger having an output electrically coupled to the additional battery; and
an additional reverse-current limiter having:
a first terminal; and
a second terminal electrically coupled to the additional battery;
a mechanical interface coupling the subassembly to the additional subassembly; and
a power rail crossing the power port and the mechanical interface and electrically coupling the power-supply adapter, the load, an input of the charger, the first terminal of the reverse-current limiter, an input of the additional charger, and the first terminal of the additional reverse-current limiter.

12. The system of claim 11, wherein the charger and the additional charger are linear chargers.

13. The system of claim 12, wherein the power-supply adapter comprises a buck charger that regulates a voltage of the power rail in order to minimize heat loss caused by voltage drops across the linear chargers.

14. The system of claim 13, wherein:
the battery-powered device further comprises:
a sensing wire operable to relay a voltage of the battery to the buck charger; and
an additional sensing wire operable to relay a voltage of the additional battery to the buck charger; and
at least one of the sensing wire or the additional sensing wire crosses the mechanical interface.

15. The system of claim 13, wherein:
the battery-powered device further comprises:
a voltage-ORing component operable to relay a maximum battery voltage to the buck charger;
a sensing wire operable to relay a voltage of the battery to the voltage-ORing component; and
an additional sensing wire operable to relay a voltage of the additional battery to the voltage-ORing component; and
at least one of the sensing wire or the additional sensing wire crosses the mechanical interface.

16. The system of claim 11, wherein:
the subassembly is an eyewear front frame;
the additional subassembly is an eyewear temple; and
the mechanical interface is an eyewear hinge.

17. The system of claim 11, wherein:
the subassembly is a watch case; and
the additional subassembly is a watch band.

18. The system of claim 11, wherein the reverse-current limiter and the additional reverse-current limiter are ideal diodes.

19. The system of claim 11, wherein:
the additional subassembly further comprises an additional load;
the battery-powered device further comprises:
a third subassembly comprising:
a third load;
a third battery;
a third charger having an output electrically coupled to the third battery; and
a third reverse-current limiter having:
a first terminal; and
a second terminal electrically coupled to the third battery; and
an additional mechanical interface coupling the subassembly to the third subassembly; and
the power rail crosses the additional mechanical interface and further electrically couples the additional load, the third load; an input of the third charger, and the first terminal of the third reverse-current limiter.

20. A method comprising:
electrically coupling a load to a power rail;
electrically coupling an input of a first charger to the power rail;
electrically coupling an output of the first charger to a first battery;
electrically coupling a first terminal of a first reverse-current limiter to the power rail;
electrically coupling a second terminal of the first reverse-current limiter to the first battery;
electrically coupling an input of a second charger to the power rail;
electrically coupling an output of the second charger to a second battery;
electrically coupling a first terminal of a second reverse-current limiter to the power rail;

electrically coupling a second terminal of the second reverse-current limiter to the second battery; and electrically coupling a charging port to the power rail.

\* \* \* \* \*

UNITED STATES PATENT AND TRADEMARK OFFICE
CERTIFICATE OF CORRECTION

PATENT NO. : 11,133,693 B2
APPLICATION NO. : 16/800495
DATED : September 28, 2021
INVENTOR(S) : Gene R. Obie et al.

It is certified that error appears in the above-identified patent and that said Letters Patent is hereby corrected as shown below:

In the Specification

In Column 1, Line 9 (approx.), delete "20" and insert -- 14 --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*